INVENTORS
Floyd T. Hague and
Frederick P. Davis.
BY O. B. Buchanan
ATTORNEY

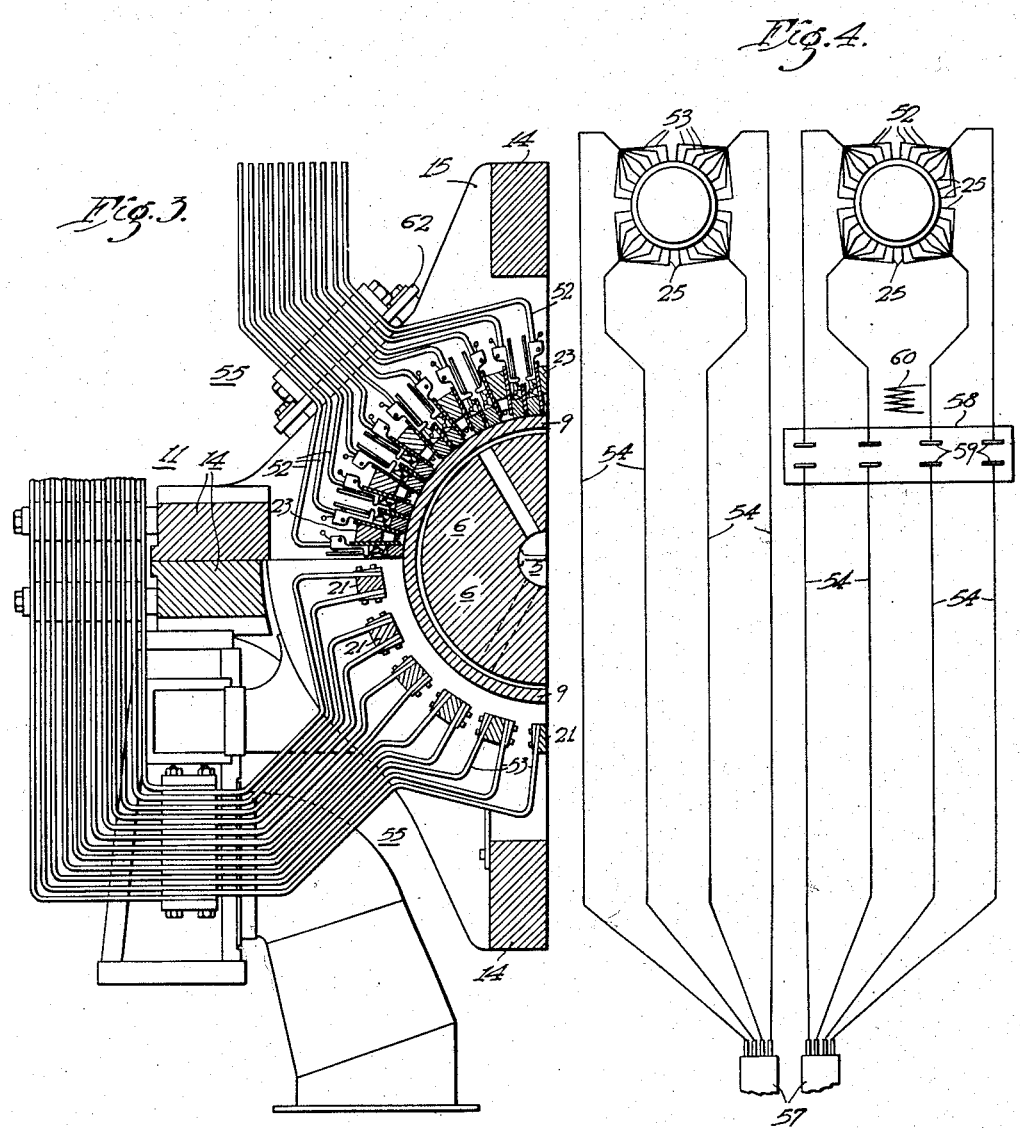

Patented Oct. 25, 1938

2,134,511

UNITED STATES PATENT OFFICE

2,134,511

COMPENSATED UNIPOLAR GENERATOR

Floyd T. Hague, Pittsburgh, and Frederick R. J. Davis, Irwin, Pa., assignors to Westinghouse Electric & Manufacturing Company, East Pittsburgh, Pa., a corporation of Pennsylvania Application December 14, 1935, Serial No. 54,518

20 Claims. (Cl. 171—212)

Our present invention relates to unipolar generators and to elements which are utilized therein, and it has particular relation to compensated unipolar generators, or to unipolar generators in which the interior reactance and armature-reaction effects are reduced to a minimum. Our invention further relates to the structure and arrangements of compensating bars, brushholders, and generator-leads whereby a generator of the aforesaid characteristics may be produced.

Our invention has particular relation to a heavy-duty, low-voltage unipolar generator which has been developed particularly for resistance-welding service, in which it is desired to obtain enormous currents, usually of a constant predetermined value, and usually for welding operations requiring only a short period of time, perhaps of the order of a minute or less, for each operation, so that the initial period required for the current to reach its full value becomes an important consideration in the welding cycle of operations.

In the design of a large unipolar generator of 150,000-ampere capacity, at something like 7 volts, one of the many important problems in the design is the problem of keeping the machine-flux, and hence the voltage, constant, during operation under load. The iron parts of such a large machine are so massive that there is required something like 3 or 4 minutes, more or less, for the flux to build up in the machine, when its field-windings are first excited, and hence, it will be readily seen that any change in the effective magnetizing ampere-turns within the machine, during, or as a result of, its delivery of load-current, will result in a gradual change in flux which is highly undesirable, in many industrial applications, such as resistance welding, because of the critical dependence of the product upon receiving an absolutely fixed and predetermined current. For example, when our machine is utilized for delivering current to a resistance-welding stand through which a pipe is passed, to weld a longitudinal seam therein, the portion of the pipe which passes through the stand in the few seconds or the fraction of a second which expires before the current reaches substantially its full value must be cut off and wasted, and the weld in the remainder of the pipe is very sensitive to any departure of the current from the predetermined value fixed by the thickness of the pipe-walls, the pipe-material and the speed at which the pipe passes through the welding-stand.

In the design of such a large unipolar generator, another important problem is that of the distribution of the current among the very large number of brushes bearing on the two collector-cylinders at the respective ends of the machine, these brushes being closely spaced both axially and circumferentially, so as to cover a very large proportion of the total collector-surface. Any inequality in the circumferential distribution of the current produces a marked compounding effect upon the generator, so that the problem is not only to keep particular brushes and compensating bars from overheating, but also to prevent undesirable compounding effects which would result in the load-current varying with time.

The magnitude of the problem of delivering 150,000 amperes will be better appreciated when it is realized that such a current requires the equivalent of 86 copper cables of 1½ inch diameter, to carry it, and we utilize approximately 700 specially cooled brushes, each of approximately 2 square inches cross-section, on each collector-cylinder, in order to collect the current.

The large unipolar generator which constitutes the particular subject of the present application has involved a considerable amount of development work which is covered in the present application, and in a number of copending applications filed by the assignee of this application; including our application, Serial No. 54,516, filed December 14, 1935, for Cooling and mounting of collectors for unipolar generators; our application, Serial No. 54,898, filed December 17, 1935, for Current-collection apparatus, now Patent Number 2,106,842, February 1, 1938; our application, Serial No. 54,517, filed December 14, 1935, for Field windings for unipolar generators; and an application of H. Matthews, Serial No. 54,465, filed December 14, 1935, for Collector-neck connections, now Patent Number 2,094,365, September 28, 1937.

In order that the current may build up very rapidly in the generator, when it is connected to its load, it is necessary that the internal inductance of the generator shall be as low as possible, and hence it is necessary, or highly desirable, to utilize a compensated generator, wherein the armature reaction is substantially eliminated, and the internal inductance of the machine is, accordingly, greatly reduced.

It is an important feature of our invention to very materially reduce the physical size of a compensated unipolar generator by means of a construction wherein the compensating bars are extended to serve as brushholder-supporting bars, thus eliminating the brushholder brackets of the usual brushholder assembly. It must be realized that a compact design of unipolar generator is contingent upon concentrating the brushes as closely together as possible. Hence the presence of any inactive elements, such as brushholder brackets, tends to greatly increase the size of the collector and of the entire machine.

Our arrangement, utilizing the compensating bars themselves as brushholder brackets, involves a definite design-relationship between the collector diameter and the armature diameter, in order that the extensions of the compensating windings or bars shall be in the proper position to support the brushholder boxes. This arrangement also requires a special trapezoidal cross-sectional shape of the compensating bars, in order that the adjacent sides of adjacent compensating bars shall be parallel, so that the brushholders can be mounted therebetween, and can be moved radially inwardly or outwardly, without loss of fit. This arrangement further requires that an insulated joint be provided, on one end of the compensating winding, in order that the two polarities of brush riggings shall not be short circuited.

Our novel arrangement, utilizing the compensating bars as brushholder brackets, removes elements which would greatly interfere with the accessibility of the brushes and brushholders, and it renders the brush rigging very accessible for daily maintenance and inspection.

An object of our invention is to provide a compensated unipolar generator in which the rear-end brushholders are mounted directly on, and entirely supported by, the compensating bars; with both the positive and negative leads of the generator connected at the front end of the machine; and preferably also, with the front-end brushholders mounted directly on, and entirely supported by, insulated extensions of the compensating bars; and preferably also, with the generator-leads of both polarities close together. The inductance between the positive and negative leads is reduced to a minimum by locating both groups of leads at the same end of the generator, and by bringing both the positive and the negative leads into the closest possible proximity, by distributing the leads uniformly through each one of a plurality of openings between the plurality of arms of the stator frame, thus permitting a very rapid building-up of the current when the circuit is closed by the connection of the load device, such as a welding stand. By maintaining the close positioning of the positive and negative leads, from the generator up to the terminals of the load device, the reactance of the leads is also reduced, thus further facilitating the rapid building-up of the current.

An object of our invention is to provide a compensated unipolar generator in which a plurality of generator-leads leave the machine through a plurality of circumferentially spaced openings in the generator-frame, each opening containing as many leads of one polarity as of the other; preferably also with the leads electrically insulated, either singly or in any convenient groupings, to constitute a plurality of separate parallel paths, substantially up to the terminals of the load which is connected to the generator, the leads of the two different polarities being preferably close together, and being preferably provided with suitable flanged abutment-means for preventing the lead-expansions and/or contractions, outside of the generator stator member, from being communicated to parts within the generator. Preferably, a separate lead or leads is or are run from each individual compensating bar or brushholder-supporting bar, or from individual brushes or groups of brushes, the resistances of the parallel paths from the outside of the generator to the respective terminals of the load-device being such as to promote approximately equal current-distribution.

An object of our invention is to provide brushholders suspended between pairs of compensating bars, or between other brushholder-supporting bars, the cross-sections of which are trapezoidal, so as to present substantially parallel faces between which the brushholders are connected.

A further object of our invention is to provide brushholders suspended between pairs of compensating bars or other brushholder-supporting bars, and securely fastened to one of the bars, while being so connected to the other as to be firmly restricted against radial movement, but having some freedom of relative movement at right angles to the radial direction, so as to provide some latitude for thermal expansions and contractions of the bars.

A further object of our invention is to provide a ring-support for the free ends of the brushholder-supporting bars at each end of the machine, in order to assure absolute circumferential alignment of the brushholder-supporting bars. This ring is made of high-resistance steel, and is utilized only for mechanical support and for alignment purposes. Its current-carrying capacity is negligible, in comparison with the amounts of current which are carried by the various generator-leads, so that this ring-support cannot be considered as establishing very much of a circuit between the leads or groups of leads which we desire to keep insulated from the load-terminals right into the respective current-collecting cylinders at the two ends of the generator.

A still further object of our invention is to provide a brushholder or brush assembly having removable spring-pressure mechanisms which lock into place by the spring pressure, and which may be inserted or removed instantly, without requiring the adjustment of any screws or bolts. A slight radial pressure overcomes this spring and allows the removal of each spring-mechanism, leaving all of the brushes accessible for cleaning and inspection. The spring-mechanism may then be re-installed, in the same way, without involving the necessity for rechecking the brush-tension. The removable pressure-mechanism preferably cooperates with a slant-top brush, and the pressure-mechanism has suitable abutment-parts, preferably anti-friction, for bearing upon the inclined top surface of the brush and also for engaging a lateral-thrust abutment-part or wall of the brushholder.

With the foregoing and other objects in view, our invention consists in the methods, combinations, systems and elements hereinafter described and claimed, and illustrated in the accompanying drawings, wherein:

Fig. 3 is a transverse sectional view on the lines III—III and 3—3 of Fig. 1; and Fig. 4 is a diagrammatic view showing the arrangement of the external leads, circuit-interrupter, and load-terminals.

Figure 1:
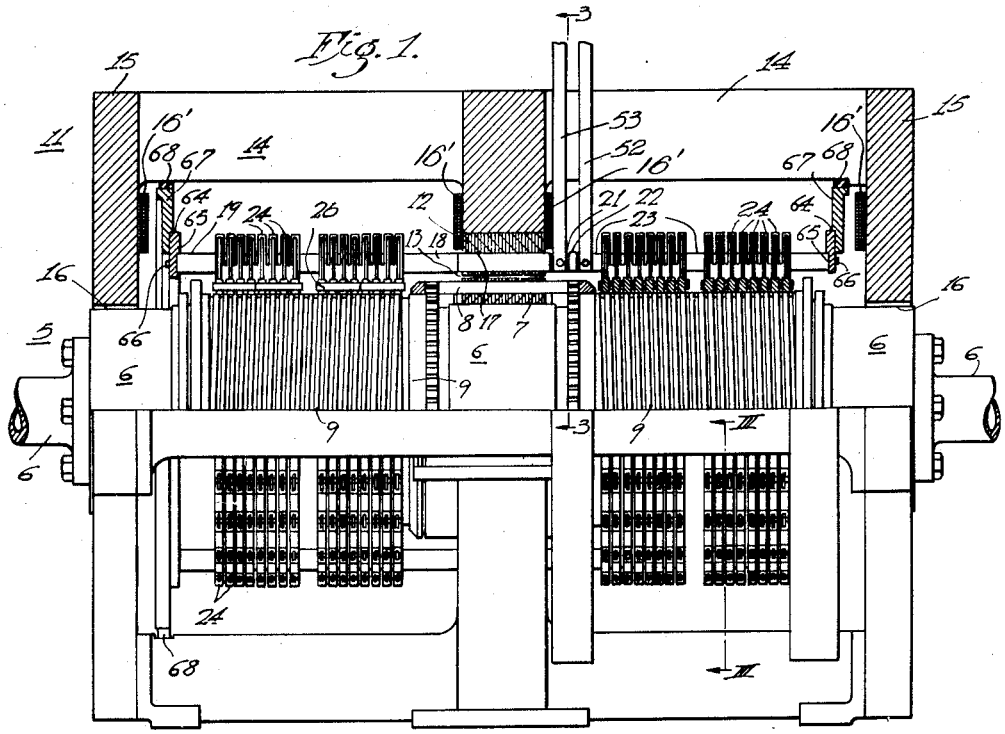
Figure 1 is a longitudinal sectional view of a unipolar generator embodying our invention, the bottom half being shown in elevation.

As shown in Fig. 1, our invention is illustrated as being embodied in a unipolar generator comprising a rotor member 5 including a shaft 6 of magnetizable material, on which is mounted an intermediately disposed rotor-core 7 which is slotted to receive a plurality of armature conductors or inductors 8. Mounted on the shaft 6, at each end of the rotor-core 7, is a long, massive collector-cylinder 9, which is a heavy casting made of a highly conducting copper alloy, as set forth in our application Serial No. 54,898, for Current-collection apparatus. The ends of the armature conductors 8 are electrically connected to the inner ends of the respective collector-cylinders 9, as set forth in the aforementioned Matthews application Serial No. 54,465, for Collector-neck connections.

The unipolar generator further comprises a stator member 11 which is provided with a slotted stator core or yoke 12 surrounding the rotor-core 7 and spaced therefrom by a cylindrical or annular air-gap 13. The outer periphery of the stator-core 12 is connected, at each end, to a stator-frame member consisting of a plurality of frame-arms 14 extending axially towards the respective ends of the machine, and terminating, at each end of the machine, in an end-bracket 15 which completes the magnetic circuit to a point 16 in the shaft 6 outside of the respective collector-cylinders 9. The magnetic circuit just described produces a unidirectional field in the cylindrical air-gap 13, the flux being maintained by field windings 16'.

Disposed in the slots of the stator-core 12, and preferably slightly insulated therefrom, as by insulation 17, are a plurality of circumferentially spaced, axially extending bars 18 constituting a compensating winding lying in the pole-face of the stator-member. The compensating bars 18 have long ends 19 at their left-hand ends, extending axially, in spaced relation, over the collector-cylinder 9 at the rear end of the machine, to provide brushholder-supporting bars 19 at that end of the machine. The compensating bars 18 have short ends 21, terminating close to the stator-core 12, at the front end of the machine, and these short ends 21 are connected, by insulating joints 22, to a plurality of separate brushholder-supporting bars 23 which comprise, in effect, insulated extensions of the several compensating bars 18, at the front end of the machine. These separate brushholder-supporting bars 23 extend axially, in spaced relation, over the collector-cylinder 9 at their end of the machine.

According to our invention, we utilize the brushholder-supporting bars 19 and 23 to support a large number of brushholders 24, which are closely spaced, both axially and circumferentially, for supporting a large number of compactly mounted brushes 25 bearing on the respective collector-cylinders 9 at the respective ends of the machine.

Figure 2:
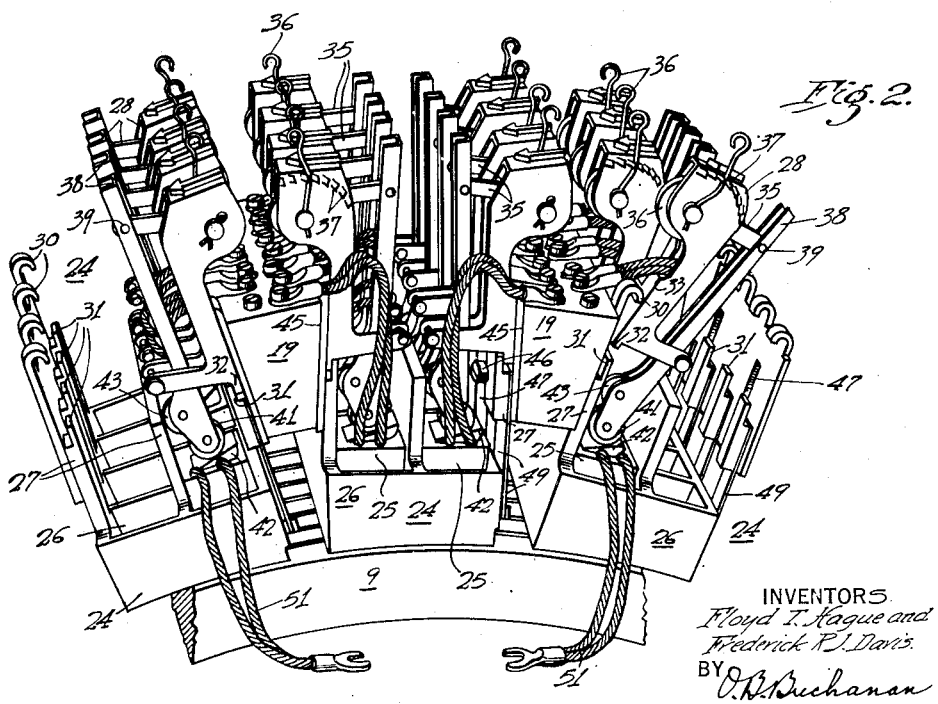
Fig. 2 is a perspective view of a part of the brushholder rigging and one of the collector cylinders.

As shown more clearly in Fig. 2, each brushholder 24 is provided with one or more brush-receiving boxes 26 for holding the brushes 25. Each brushholder has a box-extension 27, over the brushes 25, and one or more separate, removable, spring-pressure mechanisms 28, each having a lower portion projecting into said box-extension, and having an upper portion extending above said box-extension. The box-extension 27 has a plurality of hooks 30, on one side, for resisting the upward movement or radially outward movement of the spring-pressure mechanisms 28, and the box-extension also has a plurality of short straight hooks or lugs 31, disposed underneath the hooks 30, for providing a lateral-thrust means for engaging a corresponding part 32 of the spring-pressure mechanism 28, in order to resist the turning-moment exerted by said spring-pressure mechanism when the spring-pressure mechanism has its frame-part 33 hooked under one of the hooks 30.

Each spring-pressure mechanism 28 is provided, near the top of its frame-part 33, with a spring-pressed arm 35 which is so disposed that its free end is pressed downwardly by means of a heat-treated spring 36, which is so mounted that the spring pressure may be adjusted by means of a series of hooks or notches 37, as shown in Fig. 2. A brush-engaging tension-finger 38 is pivotally engaged, near its top, by each spring-pressed arm 35, as indicated by the hinge-pintle 39. The lower end of the brush-engaging tension-finger 38 terminates in a roller 41 which presses downwardly on the inclined upper surface 42 of its associated brush 25. Each finger 38 is further provided, somewhere near its lower end, with a lateral-thrust abutment-part, in the form of a roller 43 which engages a wall of the box-extension 27. The inclined upper surfaces 42 of the brushes 25 help to prevent chattering of either the brushes or the tension-fingers 38.

When the spring-pressure mechanism 28 is in place, the portion of its frame-part which hooks under the hook 30 of the brushholder is pressed upwardly, and held in firm engagement with said hook, by reason of the reaction of the spring-pressed arm 35 which is pressing the finger 38 against the inclined top surface 42 of the brush 25. To remove a spring-pressure mechanism, all that is necessary is to press downwardly on the frame-part 33 thereof, so as to disengage it from the hook 30, as shown for one of the spring-pressure mechanisms in Fig. 2.

It will be noted that the brushholder-supporting bars 19 and 23, which support the brushholders 24, are trapezoidal in cross-section, so that the adjacent or opposed inner faces 45 of each successive pair of brushholder-supporting bars are substantially parallel. The brushholders 24 are mounted between these parallel faces 45 and are secured thereto by screws 46 which pass through vertical or radial slots 47 in the box-extensions 27 of the brushholders 24, so as to provide for vertical of radial adjustment of the brushholders, in the event of wearing of the surface of the collector-cylinder 9. In order to provide for some relative movement between adjacent brushholder-supporting bars 19 and 23, due to thermal expansions and contractions, without imposing destructive strains on the brushholders 24, each brushholder is provided, on one side, with one or more flat leaf-springs 49 which hold the top and sides of the brushholder to the bottom portion of the brushholder which is closest to the collector-cylinder 9. The springs 49 thus provide a connection which is rigid in the radial direction, but which permits a certain amount of relatively free movement in a direction at right angles to the radial direction.

Each brush 25 is provided with a brush-lead or pigtail 51, which is electrically connected to the adjacent brushholder-supporting bar 19 or 23, as the case may be, for providing a good electrical connection between said brush and said bar.

Current is conducted to or from the separate or insulated brushholder-supporting bars 23 at the front end of the machine, and from or to the short ends 21 of the compensating bars 18 at the same end of the machine, by means of a large number of generator-leads 52 and 53, respectively, as shown in Figs. 1 and 3. A separate lead is connected to each bar, or, as shown, two leads may be connected to each bar, or any other convenient number of leads may be utilized. It is desirable to keep the circuits, including the several bars, separate within the machine, and for as long a distance as is practicable outside of the machine, so as to provide a large number of parallel paths, the resistances of which are so equalized as to materially assist in securing an equable current-distribution in the several parallel paths, as there is a very decided tendency for certain brushes, brushholders and bars to become overheated, if special precautions are not taken for equalizing the current-distribution.

We have found that the axial locations of the points at which the leads 52 and 53 are connected to the bars 18 and 23 are important from the standpoint of machine-operation. When the leads 52 are connected to the outer ends of the bars 23, that is, to the ends nearest the end-bracket 15, we have observed a decided compounding tendency in the machine, which we believe to be the result of the flux generated in the relatively large loop defined by the leads 52 before they reach a position joining the leads 53 of opposite polarity. We have minimized this effect by connecting the leads 52 to the inner ends of the insulated brushholder-supporting bars 23, that is, to the ends of said bars adjacent to the short ends 21 of the compensating bars 18. In this manner, the two sets of generator-leads 52 and 53, of opposite polarities, are brought close together, and are kept close together throughout substantially their entire lengths.

It will be observed, from Figs. 1 and 3, that the stator-frame has four axial arms 14, extending over each collector-cylinder 9, at each end of the machine. Between these frame-arms 14, there are thus provided large openings 55 in the frame, and it will be noted, from Fig. 1, that an equal number of generator-leads 52 and 53 of the respective polarities is brought out of the machine through each one of the openings 55, thus reducing the reactance and promoting equal division of the currents at the begining and end of each welding operation.

As shown in Fig. 4, the generator-leads 52 and 53 are extended on, in eight separate parallel circuits 54, as far away from the generator as possible, which usually means, as far as the terminals of the load-device 57. Interposed in either the leads 52 or the leads 53, or in the four circuit-conductor extensions 54 thereof, is a circuit-interrupter 58 having a plurality of switching contacts 59, and a single switch-operating means 60 for substantially simultaneously actuating all of said switching contacts.

If the number of switching-contacts 59 is equal to the number of generator-leads, it is immaterial whether the circuit-interrupter is located close to the load or close to the generator. If, however, the number of switching-contacts 59 is less than the number of generator-leads 52, or 53, as the case may be, it is best that the circuit-interrupter be located as close to the load as possible, so that the length (and hence the resistance) of the generator-leads, up to the point of paralleling, may be as great as possible, in order to increase the current-equalizing effect. In such event, it is desirable to consider the load-terminal which is in series with the circuit-interrupter to be on the generator side of the circuit-interrupter, and it is desired that the term "load-terminal" shall be so understood in the appended claims.

The generator-leads 52 and 53, and their circuit-extensions 54, are quite massive, and they may have a distance of some 20 or 30 feet to run, between the generator and the load, so that fairly large forces may be developed therein, as a result of thermal expansions and contractions. In order to keep these forces from deleteriously affecting the internal arrangements within the generator, it is most desirable that the generator-leads 52 and 53 shall be provided with suitable flanged abutment-members 62 which take up these forces and prevent the same from being transmitted inside of the machine. The abutment-flanges 62 are firmly bolted to the stator-frame member 11 of the machine, and are either insulated from the respective individual generator leads 52 and 53, or of such high resistance that they do not materially affect the current-distribution between the several leads.

In order to firmly anchor the outer ends of the two groups of brushholder-supporting bars 19 and 23, we have devised a novel brace, in the form of a ring-support 64, at each end of the machine. Each ring-support has radial grooves 65, machined in its inner side, exactly fitting the width of the brushholder-supporting bars. In assembly, the bars are forced into these machined grooves and bolted in place, as indicated at 66, so that absolute alignment of the brush-arms is achieved by this assembly-method. Each ring-support 64 is accurately centered with respect to the frame-arms 14 by means of four radial braces 67 which bear against insulating abutments 68 underneath the respective frame-arms 14.

While we have described our invention in a single preferred form of embodiment, it will be readily understood that a number of features of our invention are of general application, and susceptible of considerable variation in their precise forms of embodiments. We desire, therefore, that the appended claims shall be accorded the broadest interpretation consistent with their language and the prior art.

We claim as our invention:

1. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, a plurality of brushholders and a plurality of brushes carried thereby and bearing on the respective collector-cylinders, generator-leads of one polarity connected to the brushes at one end of the machine, and generator-leads of the opposite polarity connected to the compensating bars at the same end of the machine, the brushholders at the other end of the machine being mounted directly on, and entirely supported by, the compensating bars.

2. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushhouder-supporting bar for holding a plurality of axially spaced brushes bearing on the collector-cylinder at its end of the machine, generator-leads of one polarity electrically connected to the brushes at said second end of the machine, and generator-leads of the opposite polarity connected to the short ends of said compensating bars at said second end of the machine.

3. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, brush-leads for electrically connecting the brushes of each group of axially spaced brushes, at each end of the machine, to one of said brushholder-supporting bars, generator-leads of one polarity connected to the brushholder-supporting bars at said second end of the machine, said connection being made at the ends of said brushholder-supporting bars adjacent to said short ends of the compensating bars, and generator-leads of the opposite polarity connected to the short ends of said compensating bars at said second end of the machine.

4. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, a plurality of brushholders and a plurality of brushes carried thereby and bearing on the respective collector-cylinders, the brushes at one end of the machine being connected to the compensating bars at said end of the machine, a plurality of generator-leads of one polarity connected to the brushes at the second end of the machine, and a plurality of generator-leads of the opposite polarity connected to the compensating bars at said second end of the machine, the axially extending stator frame member at said second end of the machine having a plurality of circumferentially spaced openings therein, and the generator-leads of the two different polarities being disposed in a plurality of groups extending through said plurality of openings, each opening containing substantially as many leads of one polarity as of the other.

5. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, a plurality of brushholders and a plurality of brushes carried thereby and bearing on the respective collector-cylinders, the brushes at one end of the machine being connected to the compensating bars at said end of the machine, a plurality of generator-leads of one polarity connected to the brushes at the second end of the machine, a plurality of generator-leads of the opposite polarity connected to the compensating bars at said second end of the machine, the axially extending stator frame member at said second end of the machine having a plurality of circumferentially spaced openings therein, the generator-leads of the two different polarities being disposed in a plurality of groups extending through said plurality of openings, each opening containing substantially as many leads of one polarity as of the other, a load device having two terminals, means for connecting the generator-leads of one polarity to one of the terminals of said load device, means for connecting the generator-leads of the other polarity to the other terminal of said load device, circuit make-and-break means having a plurality of switching contacts in series with the generator-leads of at least one polarity, and switch-operating means for substantially simultaneously actuating all of said switching contacts, the resistances of the parallel paths from the inside of the generator to the respective terminals of said load device being such as to promote approximately equal current-distribution.

6. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, a plurality of brushholders and a plurality of brushes carried thereby and bearing on the respective collector-cylinders, the brushes at one end of the machine being connected to the compensating bars at said end of the machine, a plurality of generator-leads of one polarity connected to the brushes at the second end of the machine, a plurality of generator-leads of the opposite polarity connected to the compensating bars at said second end of the machine, the axially extending stator frame member at said second end of the machine having a plurality of circumferentially spaced openings therein, the generator-leads of the two different polarities being disposed in a plurality of groups extending through said plurality of openings, each opening containing substantially as many leads of one polarity as of the other, a load device having two terminals, means for connecting the generator-leads of one polarity to one of the terminals of said load device, means for connecting the generator-leads of the other polarity to the other terminal of said load device, circuit make-and-break means having a plurality of switching contacts in series with the generator-leads of at least one polarity, and switch-operating means for substantially simultaneously actuating all of said switching contacts, the resistances of the parallel paths from the inside of the generator to the respective terminals of said load device being such as to promote approximately equal current-distribution, the leads of the two different polarities being close together, in each group.

7. A compensated unipolar generator comprising a rotor member including a shaft of magnetizable material, an intermediate disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, a plurality of brushholders and a plurality of brushes carried thereby and bearing on the respective collector-cylinders, the brushes at one end of the machine being connected to the compensating bars at said end of the machine, a plurality of generator-leads of one polarity connected to the brushes at the second end of the machine, a plurality of generator-leads of the opposite polarity connected to the compensating bars at said second end of the machine, the axially extending stator frame member at said second end of the machine having a plurality of circumferentially spaced openings therein, the generator-leads of the two different polarities being disposed in a plurality of groups extending through said plurality of openings, each opening containing substantially as many leads of one polarity as of the other, flanged abutment-members for the several generator-leads, adjacent to said openings in the stator frame member, for preventing lead-expansions and/or contractions outside of the generator stator member from being communicated to parts within the stator member, a load device having two terminals, means for connecting the generator-leads of one polarity to one of the terminals of said load device, and means for connecting the generator-leads of the other polarity to the other terminal of said load device, the resistances of the parallel paths from the inside of the generator to the respective terminals of said load device being such as to promote approximately equal current-distribution.

8. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collecting-cylinder at said second end of the machine, said separate brushholder-supporting bars being insulated from said short ends of the compensating bars, brushholder means for holding a plurality of axially spaced brushes bearing on the collector-cylinder between each pair of brushholder-supporting bars at each end of the machine, each pair of brushholder-supporting bars having their opposed inner surfaces substantially parallel, brush-leads for electrically connecting the brushes of each group of axially spaced brushes, at each end of the machine, to one of said brushholder-supporting bars, generator-leads of one polarity connected to the brushholder-supporting bars at said second end of the machine, and generator-leads of the opposite polarity connected to the short ends of said compensating bars at said second end of the machine.

9. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collecting-cylinder at said second end of the machine, said separate brushholder-supporting bars being insulated from said short ends of the compensating bars, brushholder means for holding a plurality of axially spaced brushes bearing on the collector-cylinder between each pair of brushholder-supporting bars at each end of the machine, each brushholder means being non-movably affixed to one brushholder-supporting bar, and so connected to the next adjacent brushholder-supporting bar that it is restricted against radial movement relative thereto but has some freedom of relative movement at right-angles to the radial direction, generator-leads of one polarity electrically connected to the brushes at said second end of the machine, and generator-leads of the opposite polarity connected to the short ends of said compensating bars at said second end of the machine.

10. An electric current-collecting device comprising a rotatable cylindrical current-collector member, a pair of circumferentially spaced brushholder-supporting bars extending axially, in spaced relation, over said cylindrical member, said brushholder-supporting bars having their opposed inner surfaces substantially parallel, and a brushholder, fitting between said substantially parallel surfaces, for holding one or more brushes bearing on said cylindrical member.

11. An electric current-collecting device comprising a rotatable cylindrical current-collector member, a pair of circumferentially spaced brushholder-supporting bars extending axially, in spaced relation, over said cylindrical member, and brushholder means for holding one or more brushes bearing on said cylindrical member, said brushholder means being non-movably affixed to one brushholder-supporting bar, and so connected to the other brushholder-supporting bar that it is restricted against radial movement relative thereto but has some freedom of relative movement at right angles to the radial direction.

12. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulatedly connected to, and supported by, said short ends of the respective compensating bars, a ring-support for the free ends of the brushholder-supporting bars at each end of the machine, means for mounting each ring-support within the axially extending stator frame member at its end of the machine, at least one of said ring-supports being insulated, said ring-supports being so mounted and connected that said brushholder-supporting bars are maintained in accurate circumferential alignment, brushholder means associated with each brushholder-supporting bar for holding a plurality of axially spaced brushes bearing on the collector-cylinder at its end of the machine, generator-leads of one polarity electrically connected to the brushes at said second end of the machine, and generator-leads of the opposite polarity connected to the short ends of said compensating bars at said second end of the machine.

13. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means for holding a plurality of axially spaced brushes bearing on the collector-cylinder between each pair of brushholder-supporting bars at each end of the machine, brush-leads for electrically connecting the brushes of each group of axially-spaced brushes, at each end of the machine, to one of said brushholder-supporting bars, one or more separate generator-leads connected to each of said separate brushholder-supporting bars at said second end of the machine, and one or more separate generator-leads connected to each of the short ends of said compensating bars at said second end of the machine.

14. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, brush-leads for electrically connecting the brushes of each group of axially spaced brushes, at each end of the machine, to one of said brushholder-supporting bars, one or more separate generator-leads connected to each of said separate brush-holder-supporting bars at said second end of the machine, said connection being made at the ends of said brushholder-supporting bars adjacent to said short ends of the compensating bars, and one or more separate generator-leads connected to each of the short ends of said compensating bars at said second end of the machine.

15. A compensated unipolar generator comprising a rotor member including a shaft of magnetizable material, an intermediately disposed rotor-core, and a collector-cylinder disposed at each end of the rotor-core, a stator member including an intermediately disposed stator-core surrounding said rotor-core and separated therefrom by a cylindrical air-gap, said stator member also including a frame member extending axially in each direction from the outer periphery of the stator-core, and an end-bracket for completing the magnetic circuit from each frame member to a point in the shaft outside of the collector-cylinder at that end of the machine, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, brush-leads for electrically connecting the brushes of each group of axially spaced brushes, at each end of the machine, to one of said brushholder-supporting bars, one or more separate generator-leads of one polarity connected to each of said separate brush-holder-supporting bars at said second end of the machine, and one or more separate generator-leads of the other polarity connected to each of the short ends of said compensating bars at said second end of the machine, the axially extending stator frame member at said second end of the machine having a plurality of circumferentially spaced openings therein, and the generator-leads of the two different polarities being disposed in a plurality of groups extending through said plurality of openings, each opening containing substantially as many leads of one polarity as of the other.

16. A compensated unipolar generator comprising a rotor member including an intermediately disposed rotor-core and a collector-cylinder disposed at each end of the rotor-core, a stator member including an intermediately disposed stator-core surrounding said rotor-core and separated therefrom by a cylindrical air-gap, said stator-core being slotted, a plurality of circumferentially spaced compensating bars disposed in said slots of the stator-core, said compensating bars having long ends extending axially, in spaced relation, over the collector-cylinder at one end of the machine, to provide brushholder-supporting bars at that end of the machine, said compensating bars having short ends terminating close to the stator-core at the second end of the machine, a plurality of circumferentially spaced, separate brushholder-supporting bars extending axially, in spaced relation, over the collector-cylinder at said second end of the machine, said separate brushholder-supporting bars being insulated from said short ends of the compensating bars, brushholder means associated with each brushholder-supporting bar for holding a plurality of axially spaced brushes bearing on the collector-cylinder at its end of the machine, brush-leads for electrically connecting the brushes of each group of axially spaced brushes, at each end of the machine, to one of said brushholder-supporting bars, one or more separate generator-leads connected to each of said separate brushholder-supporting bars at said second end of the machine, one or more separate generator-leads connected to each of the short ends of said compensating bars at said second end of the machine, a load device having two terminals, means for connecting the generator-leads from said separate brushholder-supporting bars to one of the terminals of said load device, means for connecting the generator-leads from said short ends of said compensating bars to the other terminal of said load device, circuit make-and-break means having a plurality of switching contacts in series with the generator-leads which are connected to at least one of the terminals of said load device, and switch-operating means for substantially simultaneously actuating all of said switching contacts, the resistances of the parallel paths from the inside of the generator to the respective terminals of said load device being such as to promote approximately equal current-distribution.

17. A unipolar generator comprising a rotor member including an intermediately disposed rotor-core and a collector-cylinder disposed at each end of the rotor-core; a stator member including an intermediately disposed stator-core surrounding said rotor-core and separated therefrom by a cylindrical air-gap; means for supporting a plurality of brushes, spaced axially and circumferentially, bearing on each collector-cylinder at each end of the machine, a plurality of separate generator-leads or groups of leads of each polarity connected in separate internal circuits within the machine, each separate internal circuit including one or more brushes bearing on the collector-cylinder at one end of the machine; a load device having two terminals, means for connecting the separate generator-leads or groups of leads of one polarity to one of the terminals of said load device, and means for connecting the separate generator-leads or groups of leads of the other polarity to the other terminal of said load device, the resistances of the parallel paths from the inside of the generator to the respective terminals of said load device being such as to promote approximately equal current-distribution.

18. A low-voltage, heavy-current unipolar generator comprising a rotor member including an intermediately disposed rotor-core and a cylindrical current-collector member disposed at each end of the rotor-core, a stator member including an intermediately disposed stator-core surrounding said rotor-core and separated therefrom by a cylindrical air-gap, a large number of circumferentially spaced brushholder-supporting bars extending axially, in spaced relation, over each one of said cylindrical members, each group of brushholder-supporting bars being substantially uniformly spaced, circumferentially, substantially all the way around their associated cylindrical current-collector member, a large number of brushholders supported in the spaces between successive brushholder-supporting bars, each brushholder having one or more brush-receiving boxes for holding a plurality of axially spaced brushes bearing on said associated cylindrical member, brush-leads for electrically connecting the brushes of each group of axially spaced brushes, at each end of the machine, to one of said brushholder-supporting bars, each brushholder having a box-extension over said brushes, and one or more separate, removable spring-pressure mechanisms, each having a lower portion projecting into said box-extension and having an upper portion extending above said box-extension, said box-extension having the equivalent of a hook, on one side, for resisting the outward movement of the spring-pressure mechanism, said box-extension further having lateral-thrust means cooperating with said hook-equivalent for resisting the turning-moment exerted by said spring-pressure mechanism, and said spring-pressure mechanism comprising a frame-part cooperating with said hook-equivalent and with said lateral-thrust means, a spring-pressed arm mounted near the top of said frame-part and so disposed that its free end presses downwardly, and a brush-engaging tension-finger pivotally engaged, near its top, by said spring-pressed arm; whereby the upward reaction of said spring-pressed arm against said frame-part normally but detachably holds said frame-part engaged under said hook-equivalent.

19. An electric current-collecting device comprising a rotatable cylindrical current-collector member, and a brushholder supported in spaced relation to said cylindrical member, said brushholder having one or more brush-receiving boxes for holding one or more brushes bearing on said cylindrical member, each brushholder having a box-extension over said brush or brushes, and one or more separate, removable spring-pressure mechanisms, each having a lower portion projecting into said box-extension and having an upper portion extending above said box-extension, said box-extension having the equivalent of a hook, on one side, for resisting the outward movement of the spring-pressure mechanism, said box-extension further having lateral-thrust means cooperating with said hook-equivalent for resisting the turning-moment exerted by said spring-pressure mechanism, and said spring-pressure mechanism comprising a frame-part cooperating with said hook-equivalent and with said lateral-thrust means, a spring-pressed arm mounted near the top of said frame-part and so disposed that its free end presses downwardly, and a brush-engaging tension-finger pivotally engaged, near its top, by said spring-pressed arm; whereby the upward reaction of said spring-pressed arm against said frame-part normally but detachably holds said frame-part engaged under said hook-equivalent.

20. An electric current-collecting device comprising a rotatable cylindrical current-collector member, and a brushholder supported in spaced relation to said cylindrical member, said brushholder having one or more brush-receiving boxes for holding one or more brushes bearing on said cylindrical member, each brush having an inclined top surface, each brushholder having a box-extension over said brush or brushes, and a spring-pressure mechanism having a lower portion projecting into said box-extension, said spring pressure mechanism having, near the top thereof, one or more spring-pressed arms, each so disposed that its free end presses downwardly, and one or more brush-engaging tension-fingers, each finger being pivotally engaged, near its top, by a spring-pressed arm, each finger having, at its lower end, a bottom abutment-part for engaging the inclined top surface of a brush, and having also a lateral-thrust abutment-part for engaging a wall of said box-extension.

FLOYD T. HAGUE.
FREDERICK R. J. DAVIS.